(12) United States Patent
Oken

(10) Patent No.: US 8,512,442 B2
(45) Date of Patent: Aug. 20, 2013

(54) SELECTIVE POLYSULFIDE COMPOSITE MEMBRANE

(75) Inventor: Aaron Oken, Wilmington, DE (US)

(73) Assignee: Aaron Oken, Wilmington, DE (US)

( * ) Notice: Subject to any disclaimer, the term of this patent is extended or adjusted under 35 U.S.C. 154(b) by 0 days.

(21) Appl. No.: 13/477,745

(22) Filed: May 22, 2012

(65) Prior Publication Data

US 2012/0297977 A1     Nov. 29, 2012

Related U.S. Application Data

(60) Provisional application No. 61/519,486, filed on May 23, 2011.

(51) Int. Cl.
*B01D 53/22*     (2006.01)

(52) U.S. Cl.
USPC ................... 95/49; 95/45; 95/51; 96/4; 96/7; 96/11

(58) Field of Classification Search
USPC .............................. 95/45, 49, 51; 96/4, 7, 11
See application file for complete search history.

(56) References Cited

U.S. PATENT DOCUMENTS

| 3,494,465 | A | | 2/1970 | Nyrop |
| 3,754,375 | A | * | 8/1973 | Bouchilloux et al. ............ 95/51 |
| 4,493,716 | A | | 1/1985 | Swick |
| 4,779,459 | A | * | 10/1988 | de Rego .......................... 73/269 |
| 5,000,855 | A | | 3/1991 | Nichols |
| 5,034,126 | A | | 7/1991 | Reddy et al. |
| 5,703,359 | A | * | 12/1997 | Wampler, III ................. 250/288 |
| 5,976,220 | A | * | 11/1999 | Braun et al. ...................... 95/45 |
| 6,986,802 | B2 | | 1/2006 | Colling et al. |
| 7,682,422 | B2 | * | 3/2010 | Tanihara .......................... 95/54 |

* cited by examiner

*Primary Examiner* — Jason M Greene
*Assistant Examiner* — Anthony Shumate
(74) *Attorney, Agent, or Firm* — RatnerPrestia

(57) ABSTRACT

A composite membrane for separating a gas from a mixed gas stream includes a fibrous non-woven substrate including consolidated synthetic thermoplastic fibers, and coextensively disposed on a surface of the fibrous non-woven substrate a continuous polysulfide rubber film adhered thereto. A method of separating a gas component from a mixed gas stream includes 1) contacting a surface of the above-described composite membrane with the mixed gas stream under conditions such that a product gas enriched in the gas component diffuses through the composite membrane; and 2) collecting the product gas.

9 Claims, No Drawings

SELECTIVE POLYSULFIDE COMPOSITE MEMBRANE

This application claims priority of U.S. Provisional Appln. No. 61/519,486, filed 23 May 2011, the entirety of which application is incorporated herein by reference.

BACKGROUND OF THE INVENTION

Although natural gas at the well-head is often more than 95% methane, for pipeline transport and ultimate use, impurities such as hydrogen sulfide, carbon dioxide, water and lower aliphatic hydrocarbons must first be removed. Hydrogen sulfide is presently removed by contacting the crude gas with a solution of an aliphatic amine which complexes with this contaminant and allows its removal. However, this process is complicated by the need to continuously remove the complexed material, decompose the complex and recycle the amine.

An alternative approach to hydrogen sulfide removal, exemplified by U.S. Pat. No. 4,493,716, the entirety of which is incorporated herein by reference, involves selective diffusion through a polysulfide membrane. Raw natural gas is purified by allowing hydrogen sulfide and carbon dioxide in the gas to rapidly and selectively diffuse through a thin film of polysulfide resin. The polysulfide resin film is supported on a microporous film of stretched polypropylene or expanded polytetrafluoroethylene (PTFE).

Despite such advances, practical membrane-based systems for removing hydrogen sulfide from gas streams has remained an elusive goal. A review of membrane processes (R. W. Baker, Ind. Eng. Chem. Res. 2002, 41, 1393-1411) makes no mention of commercial membrane processes to remove hydrogen sulfide from natural gas or refinery gas streams.

SUMMARY OF THE INVENTION

In one aspect, the invention provides a composite membrane for separating a gas from a mixed gas stream. The composite membrane includes a fibrous non-woven substrate including consolidated synthetic thermoplastic fibers, and coextensively disposed on a surface of the fibrous non-woven substrate a continuous polysulfide rubber film adhered thereto.

In another aspect, the invention provides a method of separating a gas component from a mixed gas stream. The method includes 1) contacting a surface of the above-described composite membrane with the mixed gas stream under conditions such that a product gas enriched in the gas component diffuses through the composite membrane; and 2) collecting the product gas.

DETAILED DESCRIPTION OF THE INVENTION

The inventor has found that significant problems exist with composite membranes using the support layers described in U.S. Pat. No. 4,493,716. The stretched polypropylene film used in one embodiment has only about 10% effective surface area; that is, as a supporting substrate, 90% of the area of the overlying polysulfide film is obstructed by the polypropylene film from contact with the raw gas stream. On the other hand, while the expanded PTFE film used in another embodiment has about 90% effective surface area, it is less than 1 mil thick, very expensive, very fragile and very difficult to handle.

Mechanical strength is critically important for a gas separation membrane, because in practical application the membrane must be installed and operated in some kind of mechanical restraint, typically a flat screen or spirally wound configuration. Such structures are illustrated in U.S. Pat. Nos. 5,034,126, 3,494,465, 5,000,855 and 6,986,802, all of which are incorporated herein by reference. In typical configurations, the process structure is an accumulation of many small membrane units and the integrity of these units is vitally important since bursting, tearing or failure of a single unit may require a major shutdown for repairs.

The inventor has now found that the porous properties and low cost of certain non-woven textile sheets of synthetic thermoplastic fibers are ideal substrates for supporting thin, high flux films of polysulfide rubber, allowing a high rate of diffusion of hydrogen sulfide from a gas stream, for example a hydrocarbon gas stream. The composite membrane may also be used for separating carbon dioxide or hydrogen gas from gas stream, for example a hydrocarbon gas stream. The composite membrane provides both a high effective surface area and high mechanical strength. It is readily adapted to installation and operation in process equipment that must operate under a range of conditions that may involve shaking, rattling and vibration. Suitable non-woven sheets, polysulfide resins, and methods of preparing and using composite membranes made from them will now be discussed in detail.

Non-Woven Sheet

The non-woven sheet comprises fibers or filaments. The inventor has found that many low cost, fibrous non-woven materials made predominately from thermoplastic polymers such as polyolefins (e.g., polyethylene, polypropylene, etc.), polyamides and polyesters or copolymers with these materials, can produce paper-like or fabric-like sheets providing any of a variety of suitable combinations of porosity, burst strength, tear strength, thickness, calendered surface smoothness, stiffness and softness. Such materials have now been found to be excellent practical substrates for thin films of polysulfide rubber. From among this variety of available non-woven fibrous sheets, it is possible to select materials having values of porosity, strength and surface smoothness suitable for use as a polysulfide rubber support for a particular application.

Suitable non-woven sheets include those comprising, or composed of, synthetic thermoplastic fibers consolidated into the form of a sheet. These may for example be formed by extrusion and/or electrostatic or mechanical disruption into continuous thread-like fibers, filaments or the like and more or less randomly deposited onto a surface and then consolidated into a coherent sheet. The consolidation results in bonding the fibers together, and may involve mechanical compression and/or heating and/or chemical treatment, for example solvent treatment or application of a binder. The structure contrasts with those such as described in U.S. Pat. No. 4,493,716, which are described as microporous films, which include films of expanded PTFE sold commercially under the tradename GORE-TEX® and formed by stretching a film of PTFE to form the micropores.

Examples of suitable non-woven sheets include spunbonded materials, for example spunbonded polyolefins such as polyethylene, polypropylene, etc. or spunbonded polyester or acrylic polymers. Non-woven sheets comprising electrospun fibers are also useful, as are those made from melt-blown fibers.

The non-woven sheet may comprise fibers over a wide range of diameters. For example, materials with filament diameters in the range of 50 to 500 nanometers, often referred to as nano fabrics, can be prepared with a very high degree of porosity that is especially useful for gas filtration. On the other hand, non-woven fabrics produced from fibers or filaments having random diameters ranging from approximately 1 to 500 micrometers may also be used. In some embodiments, the non-woven sheet may be surface-modified by corona treatment or other adhesion-promoting methods known in the art, thereby enhancing adhesion with the polysulfide film. The non-woven sheet may also be further modified by processes such as calendering to provide a high degree of surface smoothness and enhanced mechanical properties.

The basis weight of the non-woven sheet measured according to EN ISO 9864 will typically be at most 250 gsm (g/m$^2$), or at most 200 gsm, or at most 150 gsm. To obtain sufficient strength, the basis weight of the non-woven sheet will typically be at least 10 gsm, or at least 20 gsm, or at least 30 gsm, or at least 40 gsm. However, in some embodiments the non-woven sheet may itself be supported on a scrim so that the sheet is between the scrim and the polysulfide film. In such cases, the basis weight may be substantially lower, for example 1-10 gsm. Commercially available examples of such scrim-supported non-woven sheets include DuPont™ Hybrid Membrane Technology air filtration membranes K16432 (10 gsm on scrim) and K16433 (4 gsm on scrim).

The thickness of the non-woven sheet as measured according to ASTM D5729 will typically be at least about 2 mils at 0.6 psi, or at least 3 mils, or at least 4 mils. The thickness will typically be at most 30 mils, or at most 25 mils, or at most 20 mils.

The non-woven sheet will typically have an air permeability according to ASTM D737 (Frazier permeability) of at least 100 cfm/ft$^2$ at 125 Pa, or at least 125 cfm/ft$^2$, or at least 150 cfm/ft$^2$. Typically, the air permeability will be less than 1500 cfm/ft$^2$, or less than 1000 cfm/ft$^2$.

The Mullen burst strength of the non-woven according to ASTM D3786 is typically at least 20 psi, or at least 30 psi, or at least 40 psi, or at least 45 psi, or at least 50 psi. There is no required upper limit on the Mullen burst strength, and in some cases more than 120 psi is obtained.

Suitable exemplary non-woven sheets include products sold under the tradenames DuPont™ Spunbonded Polypropylene Filtration Media 5131WF and 5401WF. Other examples include flashspun spunbonded polyethylene sold commercially under the tradename TYVEK®, for example TYVEK® 1025BL, 1622E and 1673.

It will be understood that non-woven sheets suitable for use according to the invention are fundamentally different in structure from those described in U.S. Pat. No. 4,493,716. The non-woven sheets comprise randomly laid-down fibers or filaments that are subsequently bonded together, typically using heat and pressure. They are not films, nor are they formed from films. Expanded films, for example expanded PTFE films such as sold under the tradename GORE-TEX®, are not suitable for use according to the invention. Similarly, microporous polyolefin films such as sold commercially under the tradename CELGARD® are unsuitable. In general, non-woven sheets made from PTFE lack sufficient mechanical strength for producing a suitable non-woven sheet useful as a support for producing a composite membrane according to the invention.

Polysulfide Rubber Film

The polysulfide rubber film is made by curing a polysulfide rubber precursor. Suitable examples are sold by Toray Industries, Inc. (Tokyo, Japan) under tradenames such as THIOKOL® LP-2, LP-31 etc. The precursors can be cured to form the polysulfide rubber, which has the following general structure in which n is an integer.

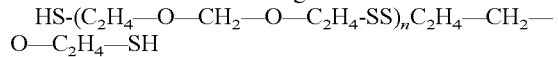

In the case of THIOKOL® products, different polymers in the series are designated by a number following the trade designation, such as LP-2. The polymers can be cured from the liquid precursor form at room temperature to form a solid rubber without shrinkage, by using a suitable curing agent, most commonly oxygen donating materials such as lead dioxide, calcium peroxide, cumene hydroperoxide, and p-quinone dioxime, and by exposure to oxygen in an air environment. Lower valence metallic oxides, other organic peroxides, metallic paint driers and aldehydes can also function as curatives. Chemically, the LP series of polysulfides are polymers of bis-(ethylene oxy) methane containing disulfide linkages. The polymer segments are terminated with reactive mercaptan (—SH) groups, and branched mercaptan groups are built into the polymer chains to control modulus and elongation.

Each polymer is supplied with a specific proportion of branch chains which contribute to the production of crosslinking when cured. Prior to curing, LP-2, LP-12, and LP-32 have average molecular weights in the range of 3,000 to 5,000. On the other hand LP-31 in the same series has a corresponding weight of 7,000 to 9,000, while for LP-3 and LP-33 the FIGURE is about 1,000.

For purposes of the invention, the polysulfide rubber films typically have a thickness of at most 50 mils (0.050 inch), or at most 25 mils, or at most 10 mils, or at most 5 mils, or at most 1 mil. There is no specific lower limit to the thickness of the polysulfide film, as long as the film is continuous and essentially free of holes, punctures, pinpricks, gaps, perforations and the like. For practical reasons, in most cases the thickness will be at least 0.1 mil.

Method of Fabricating the Composite Membrane

To make the composite membrane, it is sufficient to merely coat the non-woven substrate with a polysulfide rubber precursor, and then cure the precursor to form a polysulfide rubber film on, and adhered to, the substrate. Any coating method known in the art may be used to coat the non-woven substrate, for examples knife-blade or gravure coating. Generally the coating will be coextensive with the non-woven substrate, covering the entire surface on one or both surfaces of the substrate. Curing is typically performed at ambient temperature in air by means known in the art.

Method of Using the Composite Membrane

The composite membrane can serve to selectively diffuse hydrogen sulfide, carbon dioxide and hydrogen out of a mixed gas stream, for example a hydrocarbon gas stream, and can be folded, pleated, wrapped around a half inch mandrel and even crumpled into a loose ball, all without damaging the polysulfide film or the substrate. Membranes can be prepared in sizes for use in many styles of equipment designed to efficiently contact a gas stream with the surface of a membrane, and to discharge the hydrogen sulfide or other contaminant for subsequent processing or disposal. The temperature of this operation need only be below the softening point of the sheet material, and explicit design information for constructing suitable process equipment can be found in "The Encyclopedia of Separation Science" Academic Press, U.K., 1990.

The composite membrane of the invention may be used for removing hydrogen sulfide from a gas stream, for example a natural gas or refinery gas stream. It may also be used to remove carbon dioxide from a gas stream, for example a combustion exhaust gas stream exiting a power plant, and may be used for purposes of carbon sequestration.

EXAMPLES

A composite membrane according to the invention is prepared as follows. THIOKOL® LP-30, a liquid polysulfide precursor, is poured in a line onto an 8-inch square spunbonded non-woven polyethylene sheet (TYVEK® 1079) having a Gurley Hill porosity (ASTM D726) of 47 seconds/100 cc and a Mullen Burst strength of 245 psi (ASTM D774), secured around the periphery to a flat surface. The liquid is drawn into a thin film using a film applicator consisting of a knife edge supported by blocks at the ends thereof, in such a manner that the knife edge is 0.001 inches above the surface of the support layer. The polymer is allowed to cure at room temperature to form a thin polysulfide rubber film about 21 µm (0.8 mil) in thickness. The resulting composite membrane has excellent permeability to hydrogen sulfide and very low relative permeability to methane, yet is extremely strong and easy to incorporate into an effective membrane separation device capable of operating under a range of conditions that may involve shaking, rattling and vibration.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A composite membrane for separating a gas from a mixed gas stream, wherein the composite membrane comprises a fibrous non-woven substrate comprising consolidated synthetic thermoplastic fibers, and coextensively disposed on a surface of the fibrous non-woven substrate a continuous polysulfide rubber film adhered thereto; wherein the fibrous non-woven substrate comprises a spunbonded polyolefin, or wherein the synthetic thermoplastic fibers comprise melt-blown fibers or electrospun fibers.

2. The composite membrane of claim 1, wherein the fibrous non-woven substrate comprises a spunbonded polyolefin.

3. The composite membrane of claim 2, wherein the polyolefin is polyethylene.

4. The composite membrane of claim 1, wherein the synthetic thermoplastic fibers comprise melt-blown fibers.

5. The composite membrane of claim 1, wherein the synthetic thermoplastic fibers comprise electrospun fibers.

6. A method of separating a gas component from a mixed gas stream, comprising
   1) contacting a surface of the composite membrane of claim 1 with the mixed gas stream under conditions such that a product gas enriched in the gas component diffuses through the composite membrane; and
   2) collecting the product gas.

7. The method of claim 6, wherein the mixed gas stream comprises a hydrocarbon gas and the gas component is hydrogen sulfide.

8. The method of claim 7, wherein the hydrocarbon gas comprises methane.

9. A method of separating a gas component from a mixed gas stream comprising
   1) contacting a surface of a composite membrane with the mixed gas stream under conditions such that a product gas enriched in the gas component diffuses through the composite membrane; and
   2) collecting the product gas;
   wherein the mixed gas stream comprises combustion exhaust gas and the gas component is carbon dioxide; and wherein the composite membrane comprises a fibrous non-woven substrate comprising consolidated synthetic thermoplastic fibers, and coextensively disposed on a surface of the fibrous non-woven substrate a continuous polysulfide rubber film adhered thereto.

* * * * *